Oct. 22, 1968 R. A. MUNSE 3,406,734
SLEEVE TYPE FASTENER FOR STUDS
Filed July 11, 1966 2 Sheets-Sheet 2

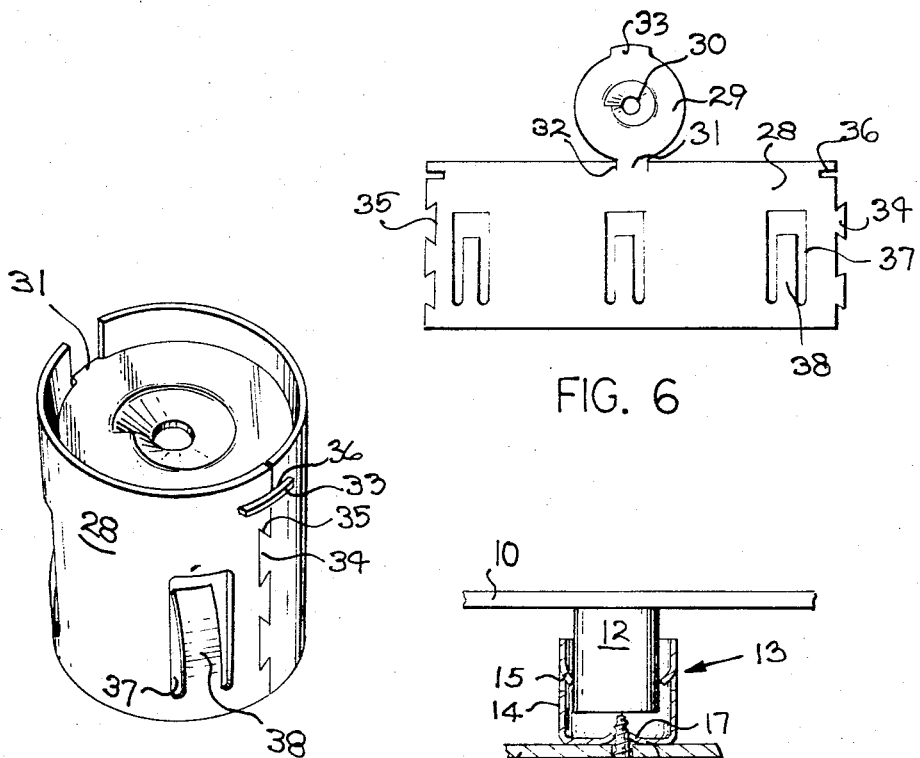
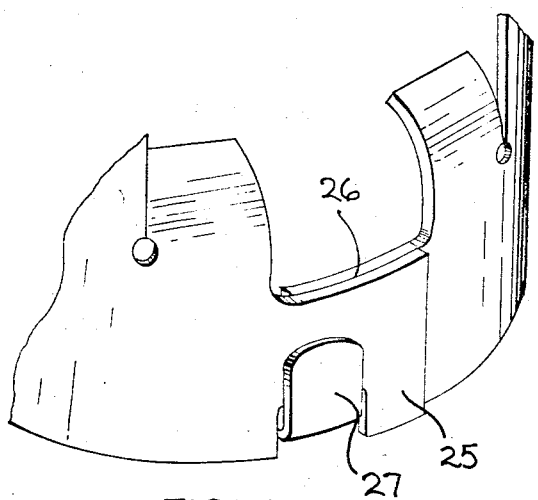

INVENTOR.
ROBERT A. MUNSE
BY
Fraser + Fraser
ATTORNEYS

United States Patent Office 3,406,734
Patented Oct. 22, 1968

3,406,734
SLEEVE TYPE FASTENER FOR STUDS
Robert A. Munse, Perrysburg, Ohio, assignor, by mesne assignments, to Vare Corporation, New York, N.Y., a corporation of New York
Filed July 11, 1966, Ser. No. 564,060
1 Claim. (Cl. 151—41.75)

ABSTRACT OF THE DISCLOSURE

A one-piece sheet metal fastener for securing a pair of spaced panels, one of the panels having a stud extending toward the other panel. The fastener is in the form of a sleeve of tubular form, which is slidable on the stud, and the free adjacent edges of the sleeve are held together by a bent hook means on one edge portion engaging notch means on the other edge portion. The sleeve has an integral base bridging the end walls of the sleeve and on the base is a nut for receiving a screw applied from the panel other than the one having the stud. The sleeve is also provided with detent means, which can ride over the stud during application but which resists separation of the sleeve from the stud. The detent means is in the form of one or more inwardly inclined tabs formed by slitting the metal of the sleeve adjacent the hook and notch means.

---

An object is to produce a simple fastener of this type which can be readily applied to a stud but is retained against release and is equipped with a nut to receive a screw for securing an object, such as a panel, thereto.

Another object is to produce a unitary fastener for stud application which has a wall portion formed into cylindrical shape and retained in such shape by integral interfitting members, is provided at one end with a nut-containing base, held rigidly in place, and is equipped with detents enabling the fastener to be pressed on the stud but resisting return or loosening movement thereof.

A further object is to produce a fastener of this type which can be produced economically from a single piece of sheet metal and after being formed, is held in shape by integral lacing means without the use of additional securement.

Other objects and advantages of the invention will hereinafter appear and, for purposes of illustration but not of limitation, embodiments of the invention are shown on the accompanying drawings, in which—

FIGURE 1 is a sectional elevation partly in section and somewhat schematic, showing a pair of panels, one having a stud and showing the fastener in assembled relation for connecting the parts together;

FIGURE 4 is a fragmentary perspective view of an alternate form showing another means for lacing or securing the end walls in assembled relation;

FIGURE 5 is an end perpective view of another form of fastener in which the base containing the nut impression is recessed in the sleeve and the end walls are secured in a different manner; and FIGURE 6 is a plan view of the blank from which the fastener shown in FIGURE 5 is formed.

Figure 3:
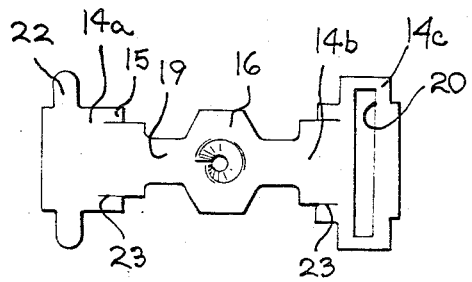
FIGURE 3 is a plan view of the blank from which the fastener shown in FIGURE 2 is formed.

Referring to FIGURE 1, a pair of laterally spaced panels 10 and 11 are shown, the panel 10 having rigid therewith a depending plastic stud 12. For connecting the panels together, a cup-shaped sheet metal fastener 13 is provided. The fastener has side walls 14 provided with struck-out inwardly inclined tabs 15 for impinging against the walls of the stud 12. The tabs permit the fastener 13 to be pressed onto the stud 12 but prevents separation or retrograde movement thereof. The fastener has at the lower end a transverse base 16, which has a centrally arranged nut impression 17 typical in the form of a Prestole, which, as is well known in the art, constitutes a frusto-conical protuberance having a radial slit, the edge of the hole being in the form of a helix for threadedly engaging a screw such as 18, which extends through a hole in the panel 11.

Figure 2:
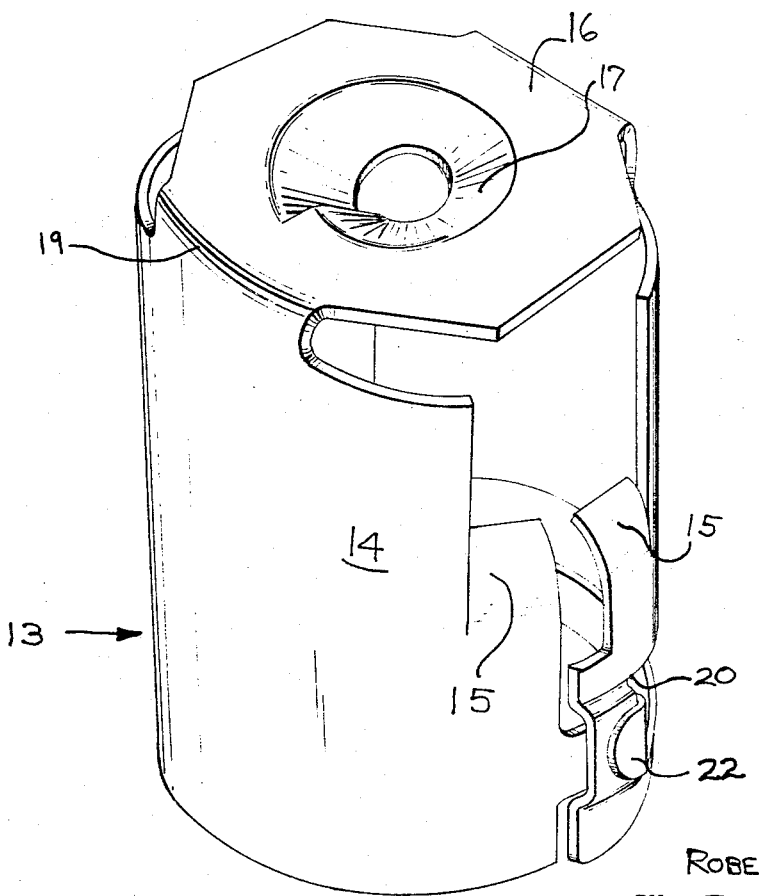
FIGURE 2 is an enlarged end perspective view of a fastener such as indicated on FIGURE 1.

FIGURES 2 and 3 show one form of a unitary sheet metal fastener 13, the same being formed from the blank shown on FIGURE 3. The fastener comprises a flat base 16 having the nut impression 17 and provided at opposite sides with neck portions 19 to the ends of which are integrally connected side wall portions 14a and 14b. The side wall portions are formed arcuately as indicated into a cup shape. In the wider terminal wall portion 14c of the wall portion 14b is an elongate rectangular slot 20 and projecting laterally from opposite sides of the wall portion 14a are outwardly extending fingers 22, which, as indicated on FIGURE 2, in the assembled form of the fastener, project through the slot 20 and are bent over into hook form to overlap portions of the terminal wall portions 14c contiguous to the ends of the slot respectively. In this manner the walls are laced and retained in the desired assembled condition.

Formed by slitting the outer edge portions of the wall portions 14a and 14b along lines 24, are pairs of tabs 15, these being bent at their free ends inwardly to provide edge portions for impinging relation to the plastic stud 12. As above indicated, the four tabs 15 enable the fastener to be pressed over the stud 12 but any tendency of movement in the opposite direction is prevented by the tabs biting into the walls of the stud.

FIGURE 4 shows a fragment of a fastener which, in the main, is in accordance with that shown on FIGURES 2 and 3 except for the means by which the side wall portions are secured or laced together. In this form notched extensions 25 are formed on one wall portion to overlap extensions 26 of the adjacent wall portion, a finger 27 of the latter being bent upwardly to hook into the adjacent notch in overlapping relation to the extension 25. It will be understood that similar structure is provided on opposite sides of the fastener, such as explained in connection with the fastener shown on FIGURE 2.

In the alternate form of the fastener shown on FIGURES 5 and 6, the body blank forms a wall portion 28 in sleeve-like form. The disc-like base portion is circular as indicate at 29, and has a central nut impression 30. The base portion 29 is integrally connected to an intermediate portion of the wall portion 28 by a neck 31, the sides of the neck being formed by slits 32 extending inwardly from the adjacent edge of the wall portion. In diametrically opposed relation to the neck 31 is a projection or tab 33. Along one narrow edge of the wall portion 28 are dovetail shaped projections 34 and along the opposite edge of the wall portion are notches 35, which are shaped to receive the respective dovetailed projections 34. Relatively narrow notches 36 are formed at the edges of the wall portions which, when the body portion is formed into cylindrical shape, receive the tab or projection 33 for assisting in supporting the base portion 29. In this instance three inverted U-shaped cutouts 35 are formed in the wall portion 28 in spaced relation to provide retaining tabs 38.

It will be understood that in forming the fastener the base portion 29 is first bent inwardly at the neck 31 to assume a position at right angles to the axis of the fastener. The body 28 is formed into cylindrical shape and the dovetail projections 34 arranged in interlocking engagement with the respective notches 35. The tab or projection 33 enters the notches 36 which, when brought into abutting relation, provide an aperture sufficient to receive the projection 33. Finally, the upper end portions of the retaining tabs 38 are bent inwardly, such as indicated on FIGURE 5, to form a biting edge to impinge against the outer surface of the plastic stud 12.

From the above description it will be apparent that I have provided an exceedingly simple sheet metal fastener which can be formed from a single piece of material and shaped into cylindrical or cup-shaped form and in a simple manner secured or laced together to retain it in its desired shape. It can be readily pressed over a stud of plastic or other material and when in place the several tabs bite into the outside of the stud and hold the stud against retrograde or loosening movement. This enables the obtaining of a secure and reliable connection between two panels, one of which has a rigid stud or a series of studs of plastic or other material to receive the fastener.

Numerous changes in details of construction, arrangement and choice of material may be effected without departing from the spirit of the invention, especially as defined in the appended claim.

What I claim is:

1. A fastener for securing a pair of spaced panels, one panel having a stud extending toward the other panel, the fastener comprising a sleeve in the form of a single piece of sheet metal slidable on said stud, said sleeve being bent to tubular form with free adjacent edges, means for holding said free edges from separating including bent hook means on one edge portion engaging notch means on the other edge portion, an integral base bridging the end walls of said sleeve, nut means on said base adjacent such other panel for receiving a screw from the latter, and detent means on said sleeve to be pressed on said stud but resisting retrograde movement or separation therefrom, said detent means comprising inwardly inclined tabs formed by slitting the metal of said sleeve adjacent said holding means.

References Cited

UNITED STATES PATENTS

| | | | |
|---|---|---|---|
| 1,208,999 | 12/1916 | Malaby | 85—71 |
| 2,156,003 | 4/1939 | Tinnerman | 85—36 |
| 3,135,309 | 6/1964 | Soltysik | 85—36 |

FOREIGN PATENTS 356,044   9/1931   Great Britain.

EDWARD C. ALLEN, *Primary Examiner.*